United States Patent [19]

Harroun

[11] Patent Number: 4,527,930
[45] Date of Patent: Jul. 9, 1985

[54] BALL NOSE END CUTTING TOOL
[76] Inventor: Hugh Harroun, 111 Elm St., Holly, Mich. 48442
[21] Appl. No.: 477,782
[22] Filed: Mar. 23, 1983
[51] Int. Cl.³ .............................................. B26D 1/00
[52] U.S. Cl. ........................................ 407/42; 407/48
[58] Field of Search ................ 407/34, 36, 40–42, 407/54, 104, 105, 48

[56] References Cited

U.S. PATENT DOCUMENTS 3,125,799  3/1964  Bennett ................................ 407/54
4,280,774  7/1981  Hayama ............................... 407/42

FOREIGN PATENT DOCUMENTS 2902420  7/1980  Fed. Rep. of Germany ....... 408/713
157418  12/1980  Japan ................................... 407/42
132910  8/1982  Japan ................................... 407/54

Primary Examiner—Leonidas Vlachos
Attorney, Agent, or Firm—Cullen, Sloman, Cantor, Grauer, Scott & Rutherford

[57] ABSTRACT

A ball nose end cutting tool having cutting bit inserts which may be quickly and accurately positioned on a tool holder and secured thereto with ease. The present construction permits the cutting bits to be mounted in a substantially end-to-end relationship for cutting to the center of the tool holder thereby reducing the cutting forces at the center. The tool holder has a pair of opposed bit-receiving pockets formed therein that are adapted to hold two identical high-speed cutting bits. Each pocket includes a dovetailed locator edge surface, a planar inner side wall, and an open outside area which permits unrestricted chip flow. The cutting bits are adapted to seat against the dovetailed locator edge surfaces and planar side walls of the two pockets in the tool holder. The planar side walls are oppositely inclined, each being at an approximately 5° negative rake angle to the longitudinal axis of the tool holder, for the purpose of properly positioning the cutting edges of the bits. The cutting edges are positioned to provide a cutting action from the outside periphery of the tool holder inwardly to the center of the holder. In plan view, the cutting edges form a substantially continuous trigonometric reverse curve from the center of the holder with the curve having substantially parallel outwardly extending tangent portions.

1 Claim, 4 Drawing Figures

BALL NOSE END CUTTING TOOL

BACKGROUND OF THE INVENTION

The present invention relates to a ball nose end cutting tool having cutting bit inserts which may be quickly and accurately positioned on a tool holder and secured thereto with ease. Further, the present construction permits the cutting bits to be mounted in a substantially end-to-end relationship for cutting to the center of the tool thereby reducing cutting forces at the center.

Ball nose end mills are used in many metal working applications including mold making where the inherent strength and milling advantages of a fully radiused cutting edge for the copy milling of a mold cavity is best demonstrated. Its ball shape allows the end mill to attack the mold cavity from any angle or direction. The cutting edge when generated through the end of the ball mill becomes helical with rotation. This promotes shearing of the metal to be cut in an efficient manner.

It has heretofore been the practice, in the case of ball nose end milling tools, to secure the cutting bits on a tool holder by brazing. Typically, cutting bits are spaced apart at the center of the ball nose end to permit movement of a grinding tool or fixture when the bits are to be re-sharpened. Because of the brittleness of the high-speed cutting material used for the bits, the bits are susceptible to breakage under cutting pressure because of the gap therebetween. When the cutting bit breaks, there is, aside from the loss of the broken bit, the expense of the time of shutting down the tool to replace the bit.

Further, the concept of indexable inserts presents a problem if the concept were applied to a ball nose end mill because of the need for clamps over the inserts for heavy roughing which would restrict chip flow. Staggering several indexable inserts around the ball nose radius and overlapping portions of the previous insert in order to encompass the entire radius would inhibit chip flow, would still only permit no more than one insert to extend to the center line of the ball nose, and would reduce the accuracy of the milling process.

Thus, it is an object of the present invention to provide a ball nose end cutting tool using removable cutting bits which are less susceptible to breakage in usage. Another object of the invention is to provide a construction whereby cutting bits may be accurately installed and replaced with ease. Further, it is an object of the present invention to employ opposed cutting bits which cut from the outside periphery of the tool holder inwardly to the center thereby reducing the cutting forces at the center and providing for improved plunging capability.

SUMMARY OF THE INVENTION

The present construction provides a ball nose end mill having the ability to plunge freely at high feed rates into the work without chip fouling. It permits milling in an area on the flank of the cutting tool as well as the radius of the ball nose end. Thus, the ball nose end mill of the present invention provides the longest continuous cutting edge possible to promote the shearing action desired to produce large chips by bringing at least two cutting flutes to center. By bringing two continuous cutting edges to center, superior plunging capabilities can be realized. Further, the present invention provides for precise and consistent location of the cutting bits while eliminating the clamps generally required for holding the cutting bits during heavy milling. By eliminating the clamps on the cutting bits, heavy chip flow is permitted thereby resulting in high metal removal rates.

The cutting tool of the present invention includes an elongated generally cylindrical tool holder or carrier having a shank portion which is adapted to be mounted in the shank-receiving socket of a powered rotatable spindle. The tool holder has a pair of opposed bit-receiving pockets formed therein that are adapted to hold two identical high-speed cutting bits which may be made of tungsten carbide or other high-speed cutting material.

Each pocket includes a bottom wall which extends in a transverse direction from approximately the center of the cylindrical tool holder to its periphery. The bottom walls are generally parallel to each other and slightly inclined to the longitudinal axis of the tool holder. The pockets further include end walls which extend generally in the same direction as the longitudinal axis of the tool holder but being slightly inclined thereto. Finally, each pocket includes a dovetailed locator edge surface, a planar inner side wall, and an open outside area which permits unrestricted chip flow.

The planar side walls of the pockets are oppositely inclined approximately 5° relative to the longitudinal axis of the tool holder. Each dovetailed locator edge surface is generally L-shaped to match the lengths of a corresponding pocket bottom wall and end wall. The locator surfaces are inclined at approximately 45° relative to the pocket bottom walls and end walls and are joined thereto by stepped edges.

The pockets of the tool holder are adapted to hold two identical high-speed cutting bits. The cutting bits are seated against the dovetailed locator edge surfaces and planar side walls of the pockets in the tool holder. The planar side walls are oppositely inclined, each being at an approximately 5° negative rake angle to the longitudinal axis of the tool holder, for the purpose of properly positioning the cutting edges of the cutting bits when the bits are located in their respective cutting positions. The cutting edges are positioned to provide a cutting action from the outside periphery of the tool holder inwardly to the center of the holder. In plan view, the cutting edges form a substantially continuous trigonometric reverse curve from the center of the holder with the curve having substantially parallel outwardly extending tangent portions.

The cutting bits are identical solid pieces of cutting material which are ground on the top faces thereof to form curved cutting edges. Each bit includes opposed parallel side walls and a bottom edge. The cutting bits further include vertically and horizontally disposed inclined locator edges which are adapted to seat against the corresponding vertical and horizontal legs of the dovetailed pocket locator edge surfaces. The locator edges are ground to have plane faces which are complementary to the inclined faces of the locator surfaces. Further, the locator edges are joined by an undercut portion to prevent material interference at the corners formed by the bottom walls and end walls of the pockets.

Thus, the inner side walls of the cutting bits are seated against the oppositely inclined planar pocket side walls to permit automatic positioning of the cutting bits in substantially an end-to-end relationship for forming a reverse curved substantially continuous cutting edge to approximately the center of the tool holder. While the cutting bits are positioned to permit cutting to the center of the tool holder and excellent plunging capability, the cutting bits do not bear on each other but instead bear against the vertical legs of the dovetailed locator edge surfaces to thereby permit cutting to the center while reducing the stresses being applied to the cutting bits. Further, the locator edges of the cutting bits are seated against the complementary vertical and horizontal legs of the dovetailed pocket locator edge surfaces in an easy and convenient fashion to permit quick and accurate positioning of the cutting bits at all times.

Other advantages and meritorious features of the ball nose end cutting tool will be more fully understood from the following description of the invention, the appended claims, and the drawings, a brief description of which follows.

DETAILED DESCRIPTION OF THE INVENTION

Figure 1:
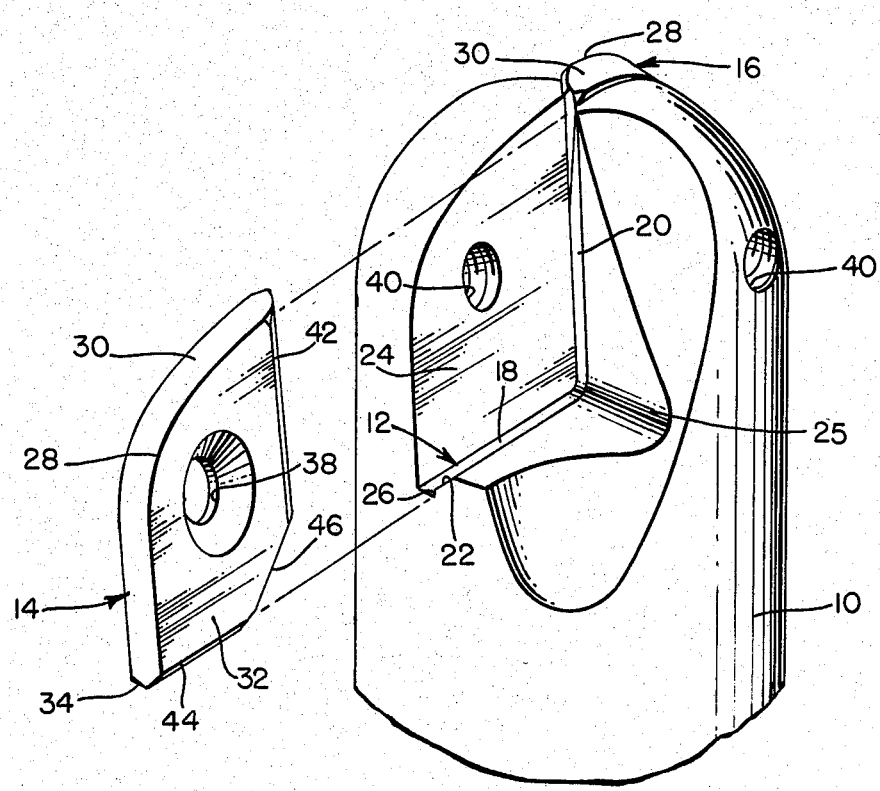
FIG. 1 is a perspective view of the end of the ball nose end cutting tool of the present invention.

Referring to FIGS. 1-4, there is shown an elongated generally cylindrical tool holder or carrier 10 having a shank portion (not shown) which is adapted to be mounted in the shank-receiving socket of a powered rotatable spindle, as is conventional. Carrier 10 has a pair of opposed bit-receiving pockets 12 formed therein that are adapted to hold two identical high-speed cutting bits 14 and 16 which may be made of tungsten carbide or other high-speed cutting material.

Each pocket 12 includes a bottom wall 18 which extends in a transverse direction from approximately the center of cylindrical carrier 10 to its periphery. Bottom walls 18 are generally parallel to each other (FIG. 3) and slightly inclined to the longitudinal axis of carrier 10. Pockets 12 further include end walls 20 (one of which being shown in FIG. 1) which extend vertically and generally in the same direction as the longitudinal axis of carrier 10 but being slightly inclined thereto. Finally, each pocket 12 includes a dovetailed locator edge surface 22, a planar inner side wall 24, and an open outside area 25 which permits unrestricted chip flow.

Planar side walls 24 merge with bottom walls 18 and are oppositely inclined approximately 5° to the longitudinal axis of carrier 10 for a purpose to be described. Each dovetailed locator edge surface 22 is generally L-shaped with vertically and horizontally disposed leg portions to match the lengths of a corresponding bottom wall 18 and an end wall 20. Locator surfaces 22 are inclined at approximately 45° relative to bottom walls 18 and end walls 20 and are joined thereto by stepped edges 26.

Figure 2:
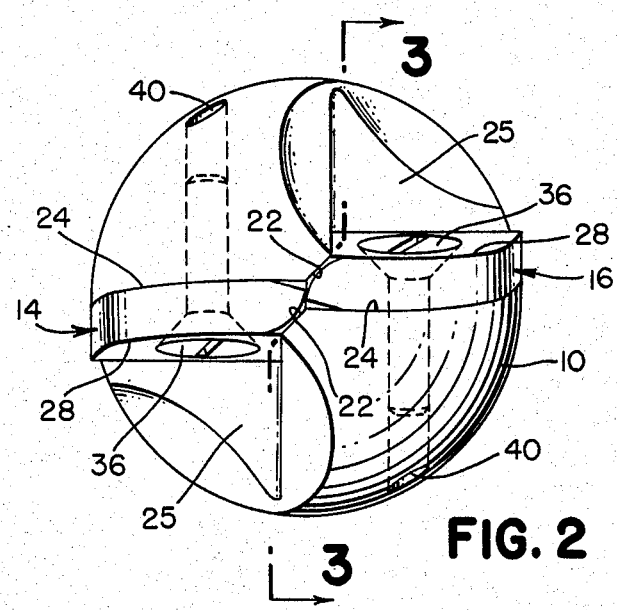
FIG. 2 is a top plan view of the ball nose end cutting tool.
Figure 4:
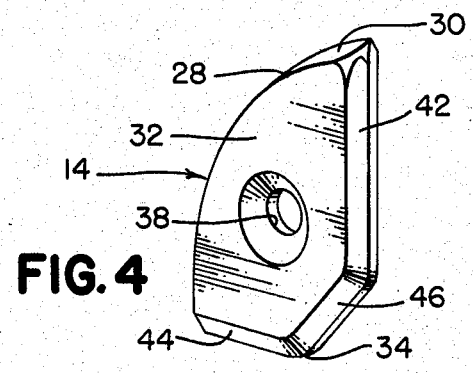
FIG. 4 is a perspective view of an individual cutting bit.
Figure 3:
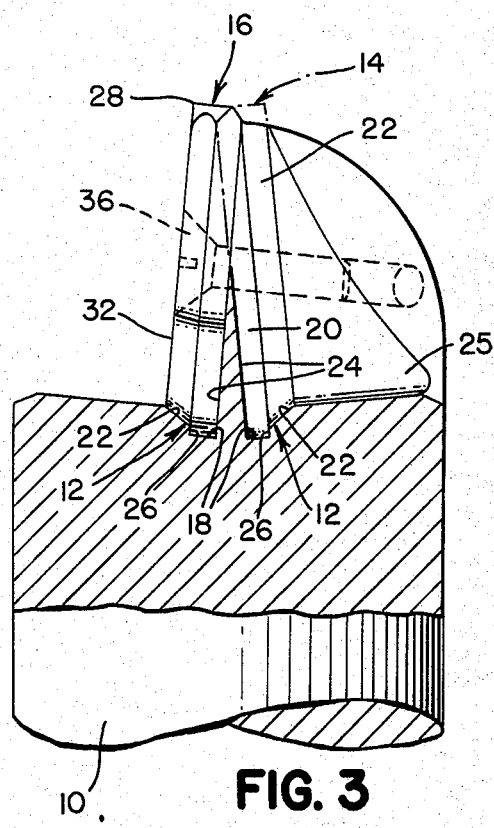
FIG. 3 is a cross-sectional view taken along line 3—3 in FIG. 2.

As described, the pockets 12 of tool holder 10 are adapted to hold two identical high-speed cutting bits 14 and 16, respectively. The cutting bits are adapted to seat against the dovetailed locator edge surfaces 22 and planar side walls 24 of the two pockets 12 in the tool holder 10. The planar side walls 24 are oppositely inclined, each being at an approximately 5° negative rake angle to the longitudinal axis of the tool holder 10, for the purpose of properly positioning the cutting edges 28 of bits 14 and 16 when the bits are located in their respective cutting positions as shown in FIG. 2. As illustrated, the cutting edges 28 are positioned to provide a cutting action from the outside periphery of the tool holder 10 inwardly to the center of holder 10. In plan view (FIG. 2), the cutting edges 28 form a substantially continuous trigonometric reverse curve from the center of holder 10 with the curve having substantially parallel outwardly extending tangent portions.

The cutting bits 14 and 16 are identical solid pieces of cutting material which are ground on their top faces 30 to form curved cutting edges 28. Each bit includes opposed parallel side walls 32 and a bottom edge 34. The two bits 14 and 16 are clamped to tool holder 10 by machine screws 36 which pass through counter sunk openings 38 in the bits for attachment to threaded openings 40 in tool holder side walls 24. Cutting bits 14 and 16 further include vertically and horizontally disposed inclined locator edges 42 and 44, respectively, which are adapted to seat against the corresponding vertical and horizontal legs of dovetailed pocket locator edge surfaces 22. Locator edges 42 and 44 are ground to have plane faces which are complementary to the inclined faces of locator surfaces 22. Further, locator edges 42 and 44 are joined by an undercut portion 46 to prevent material interference at the corners formed by bottom walls 18 and end walls 20 of pockets 12.

Thus, the inner side walls 32 of cutting bits 14 and 16 are seated against the oppositely inclined planar pocket side walls 24 to permit positioning of the cutting bits in substantially an end-to-end relationship for forming a reverse curved substantially continuous cutting edge, as illustrated, to approximately the center of tool holder 10. While the cutting bits 14 and 16 are positioned to permit cutting to the center of tool holder 10 and excellent plunging capability, the cutting bits 14 and 16 do not bear against each other but instead bear against the vertical legs of dovetailed locator edge surfaces 22 to thereby permit cutting to the center while reducing the stresses being applied to the cutting bits. Further, the locator edges 42 and 44 of the bits are seated against the complementary vertical and horizontal legs of dovetailed pocket locator edge surfaces 22 in an easy and convenient fashion to permit quick and accurate positioning of the cutting bits at all times. Finally, the present construction permits the use of identical cutting bits thereby eliminating bits that are designed oppositely for right- or left-handed usage.

It will be apparent to those skilled in the art that the foregoing disclosure is exemplary in nature rather than limiting, the invention being limited only by the appended claims.

I claim:

1. A ball nose end cutting tool comprising a tool holder having at least two opposed bit-receiving pockets formed therein that are adapted to hold corresponding cutting bits;

each pocket having an inclined locator edge surface, a planar inner side wall, and an open outside area which permits unrestricted chip flow, each pocket further including a bottom wall which extends in a transverse direction from approximately the center of said tool holder to its periphery, said bottom walls being generally parallel to each other and slightly inclined relative to the longitudinal axis of said tool holder, and each said pocket including an end wall which extends generally in the same direction as the longitudinal axis of said tool holder but being slightly inclined thereto, and said planar side walls merging with said bottom walls, and each said locator edge surface being generally L-shaped and having vertically and horizontally disposed leg portions to match a corresponding pocket bottom wall and pocket end wall, and said locator surfaces being inclined relative to said pocket bottom walls and end walls;

said planar side walls being oppositely inclined relative to the longitudinal axis of said tool holder;

means for securing said cutting bits to said pockets and said cutting bits having curved cutting edges and complementary locator edges which are seated against said inclined locator edge surfaces, and each said cutting bit including vertically and horizontally disposed inclined locator edges which are adapted to seat against the vertical and horizontal leg portions of a corresponding locator edge surface; and said cutting bits including side walls which are seated against said planar pocket side walls to permit positioning of said cutting bits in a substantially end-to-end relationship such that said cutting edges form a substantially continuous reverse curve from the center of said tool holder with said curve having substantially parallel outwardly extending tangent portions, and said cutting bits bearing against the vertical leg portions of said locator edge surfaces to thereby reduce the cutting stresses being applied to said cutting bits.

* * * * *